US012471732B2

(12) United States Patent
Doat et al.

(10) Patent No.: US 12,471,732 B2
(45) Date of Patent: Nov. 18, 2025

(54) ELECTRIC COOKING APPLIANCE

(71) Applicant: SEB S.A., Ecully (FR)

(72) Inventors: Géraldine Doat, Ecully (FR); Antonin Poupart, Ecully (FR)

(73) Assignee: SEB S.A. (FR)

( * ) Notice: Subject to any disclaimer, the term of this patent is extended or adjusted under 35 U.S.C. 154(b) by 664 days.

(21) Appl. No.: 17/946,272

(22) Filed: Sep. 16, 2022

(65) Prior Publication Data

US 2023/0101591 A1    Mar. 30, 2023

(30) Foreign Application Priority Data

Sep. 17, 2021  (FR) ........................................ 2109764

(51) Int. Cl.
| | |
|---|---|
| *A47J 27/086* | (2006.01) |
| *A47J 27/00* | (2006.01) |
| *A47J 36/06* | (2006.01) |
| *F24C 15/32* | (2006.01) |

(52) U.S. Cl.
CPC ........... *A47J 27/086* (2013.01); *A47J 27/004* (2013.01); *A47J 36/06* (2013.01); *F24C 15/325* (2013.01)

(58) Field of Classification Search
CPC ........ A47J 27/086; A47J 27/004; A47J 36/06; A47J 27/0802; A47J 27/09; A47J 37/0641; A47J 43/044; A47J 527/12; A47J 27/04; A47J 43/0772; A47J 2027/043; H05B 6/065; H05B 6/08; H05B 6/1272; H05B 6/12; F24C 15/325

USPC ....... 219/395, 399, 403, 429, 438, 432, 433, 219/436, 440, 442, 472, 474, 524, 525, 219/521; 99/332, 348, 353, 372, 376

See application file for complete search history.

(56) References Cited

U.S. PATENT DOCUMENTS

2021/0121012 A1\* 4/2021 Elliston .................. A47J 27/09

FOREIGN PATENT DOCUMENTS

| | | |
|---|---|---|
| CN | 209090836 U | 7/2019 |
| WO | 2019238794 A1 | 12/2019 |

OTHER PUBLICATIONS

French Search Report for Application No. FR 2109764 dated Jun. 16, 2022. 2 pgs.

\* cited by examiner

*Primary Examiner* — Phuong T Nguyen

(74) *Attorney, Agent, or Firm* — Lerner David LLP

(57) ABSTRACT

The electric cooking appliance includes a cooking vat; a lid having a lid body and an inner lid including a fixed closure portion attached to the lid body and a movable closure portion that can be moved relative to the fixed closure portion between a raised configuration in which the fixed closure portion and the movable closure portion close the cooking vat, and a lowered configuration in which the fixed closure portion and the movable closure portion define an air vent passage to the outside of the cooking volume and an air intake passage to the inside of the cooking volume; a fan configured to generate an airflow; and a heating device configured to heat the airflow generated by the fan and located near the air intake passage when the lid occupies the closed position.

12 Claims, 7 Drawing Sheets

[Fig 1]
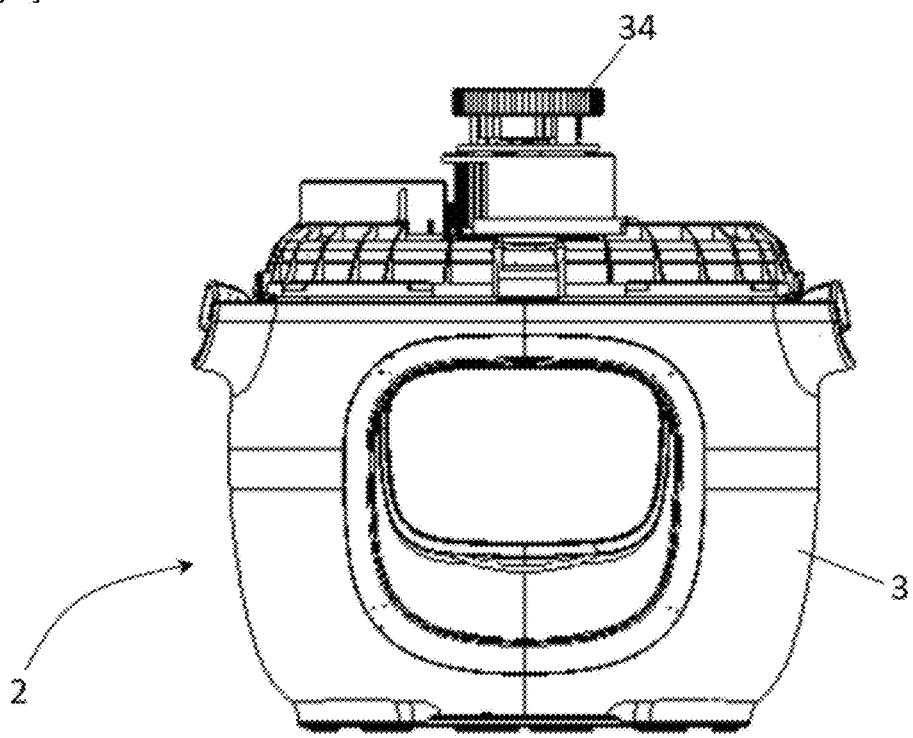
[Fig 2]
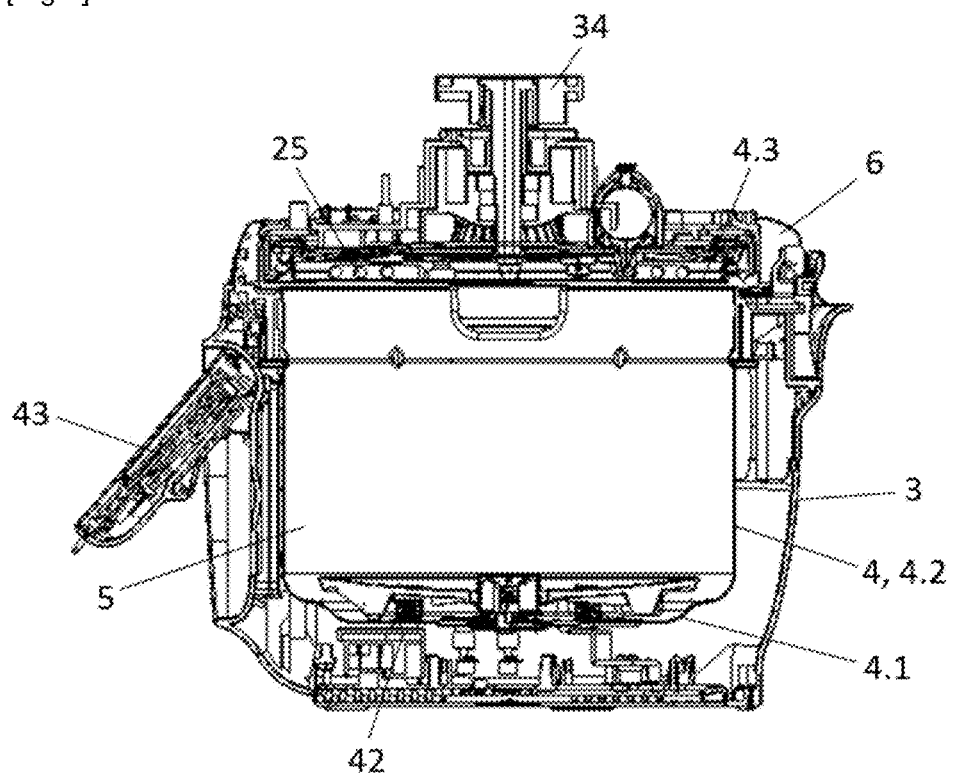

[Fig 3]
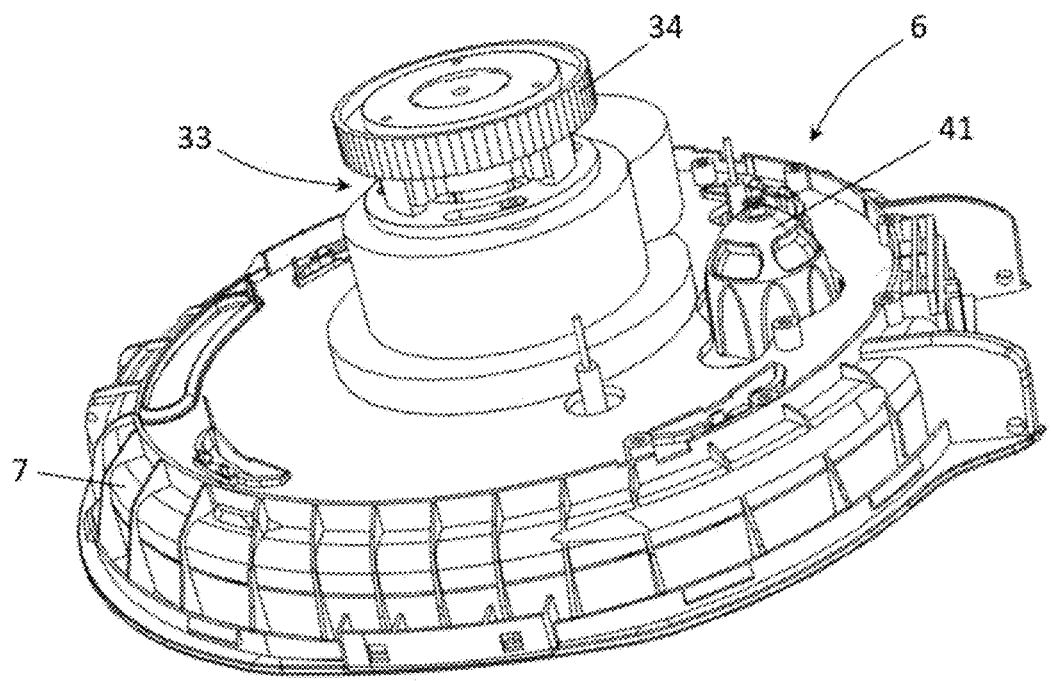
[Fig 4]
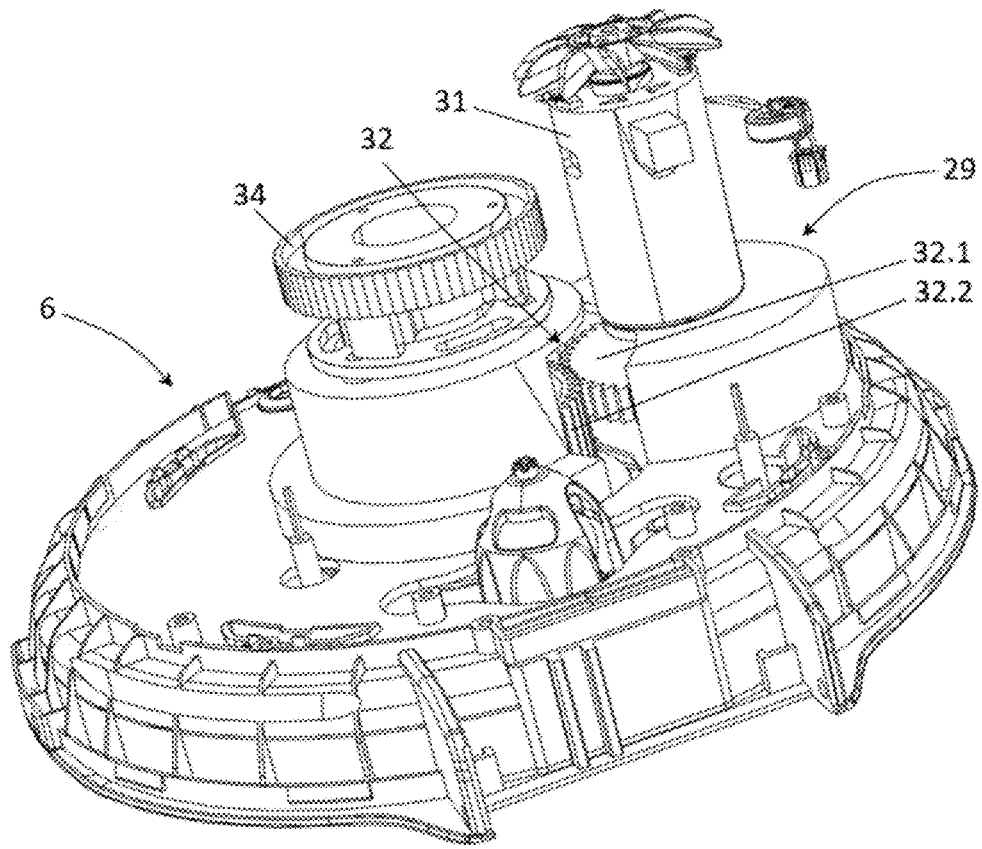

[Fig 5]
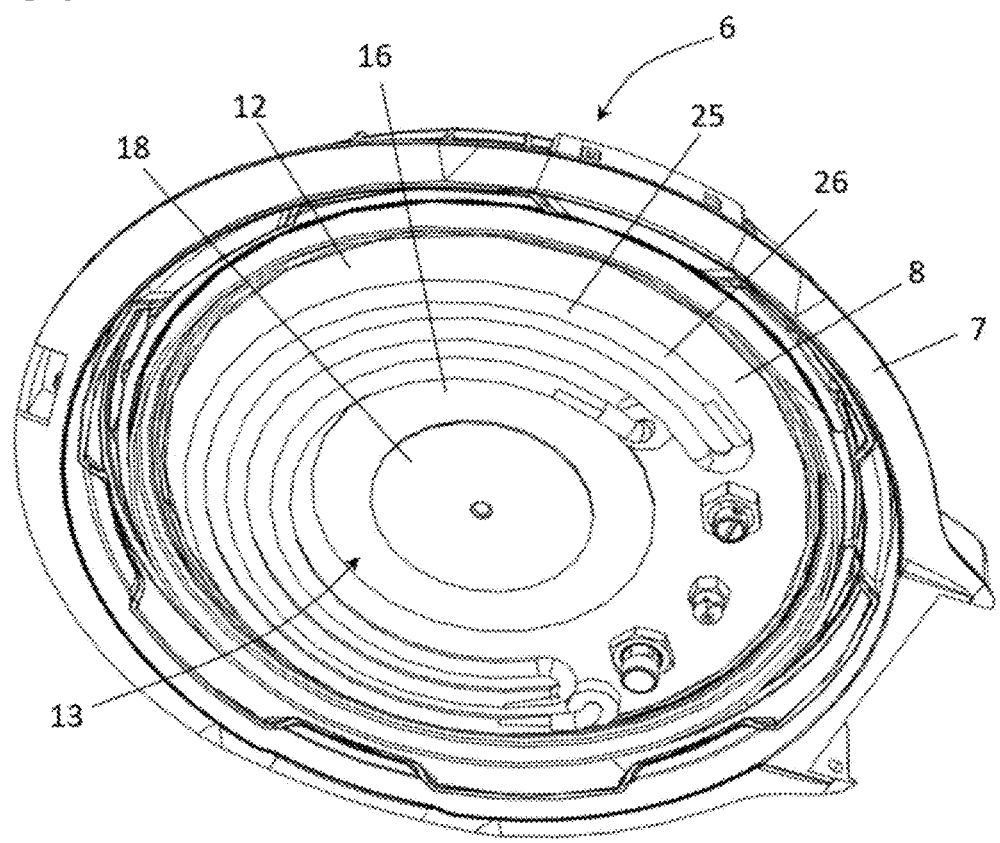
[Fig 6]
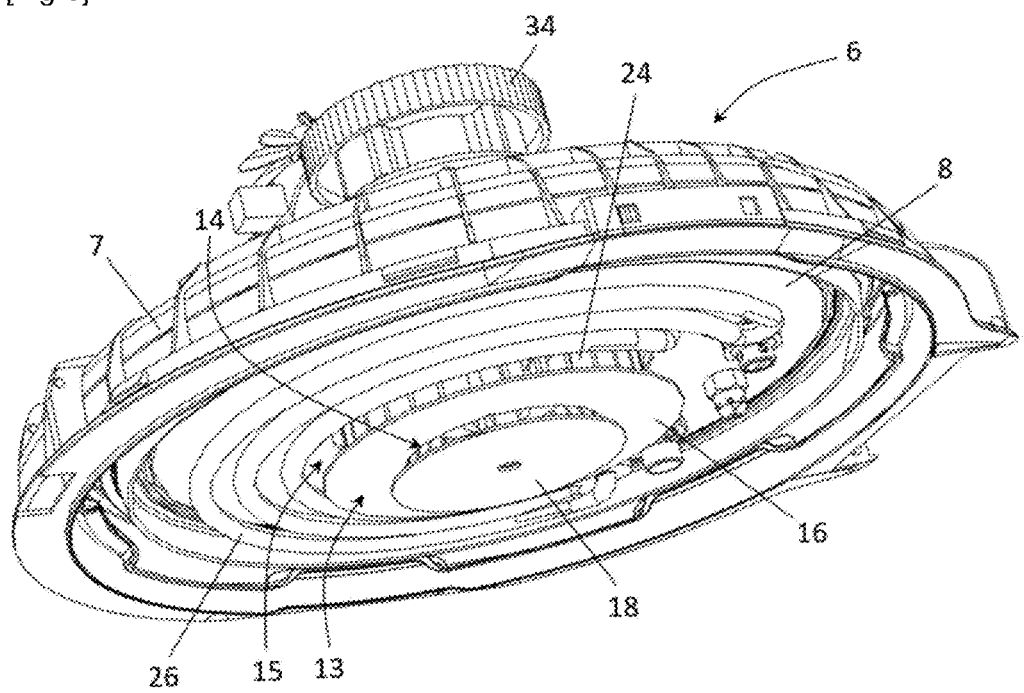

[Fig 7]
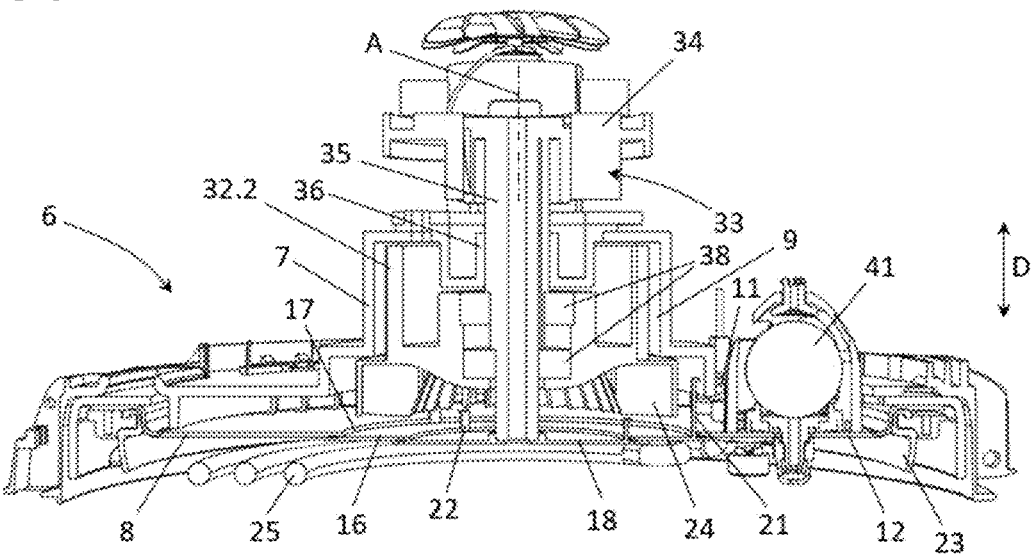
[Fig 8]
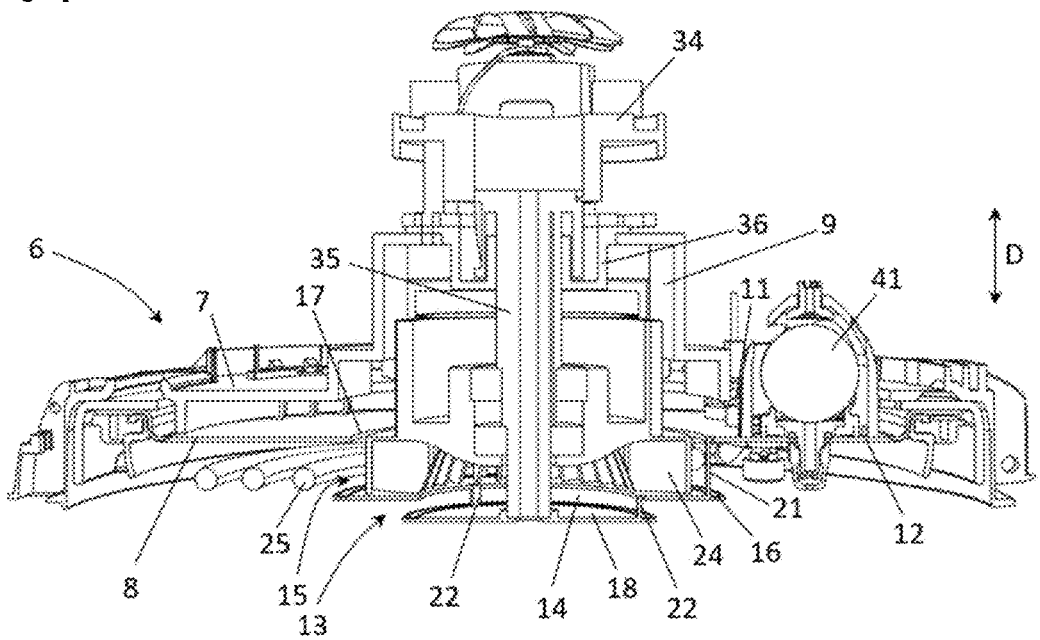

[Fig 9]
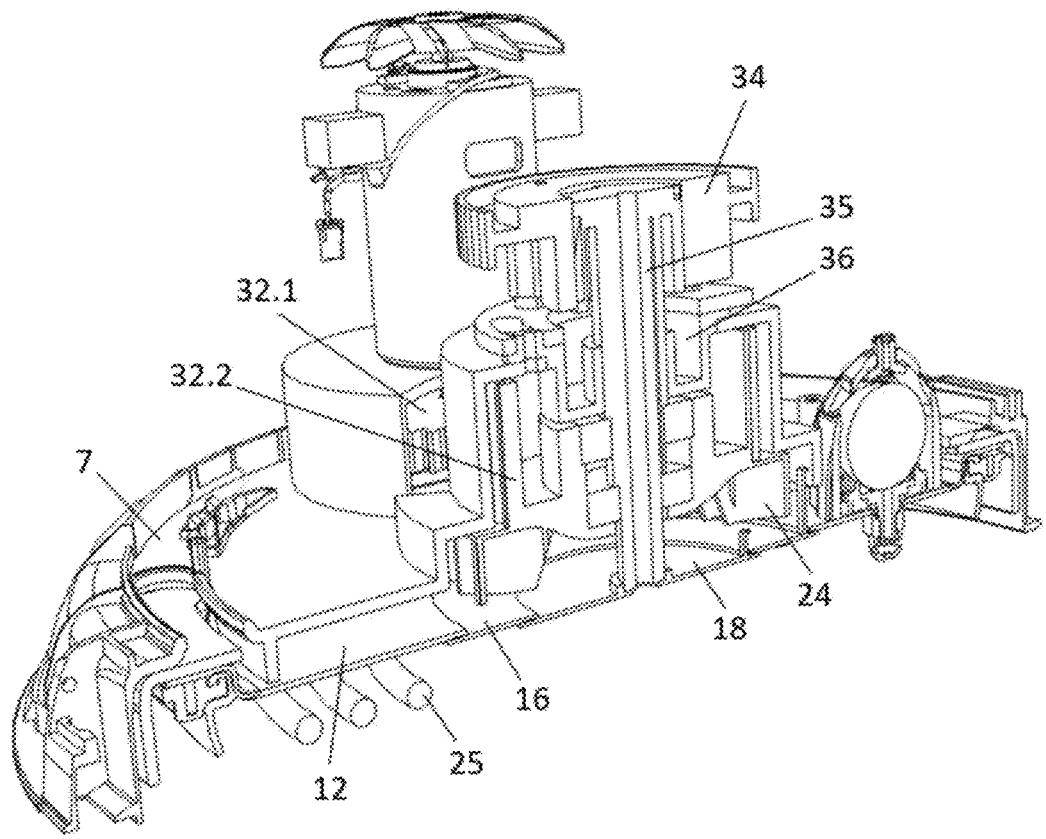

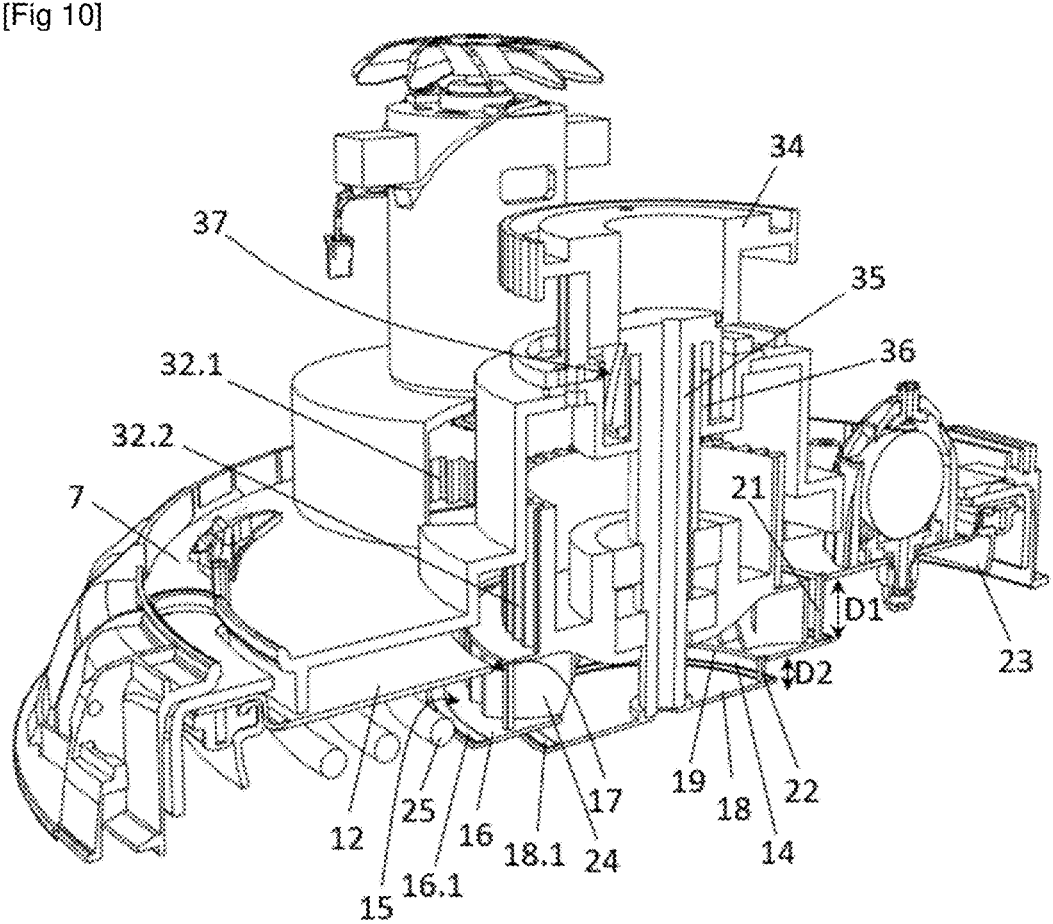
[Fig 10]

[Fig 11]
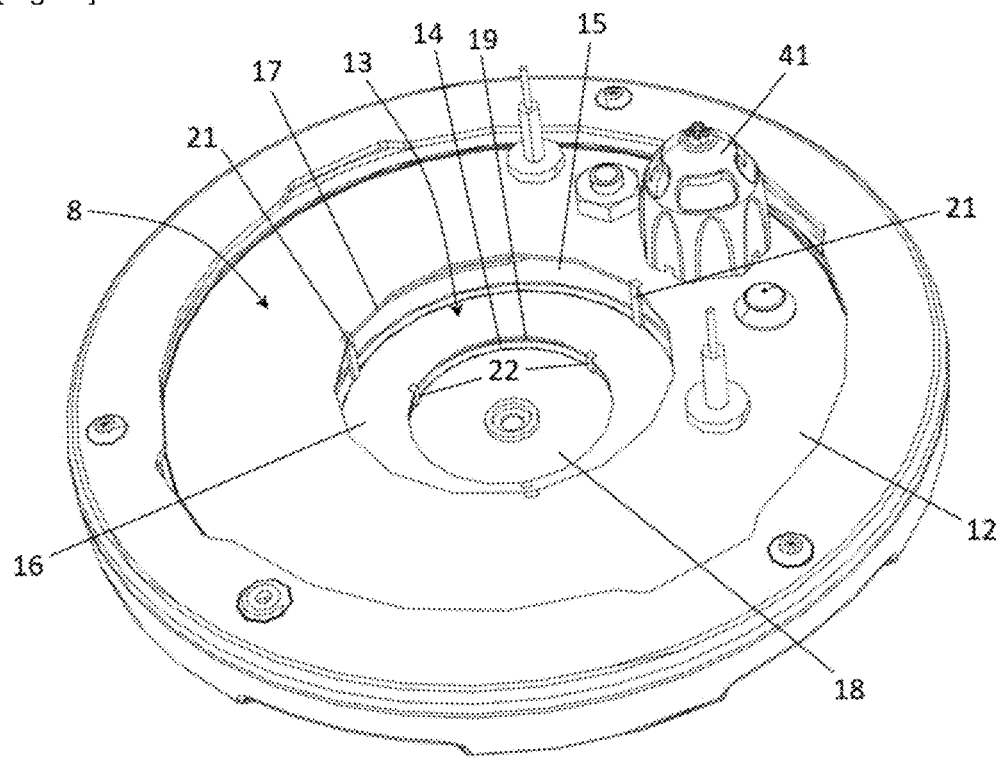
[Fig 12]
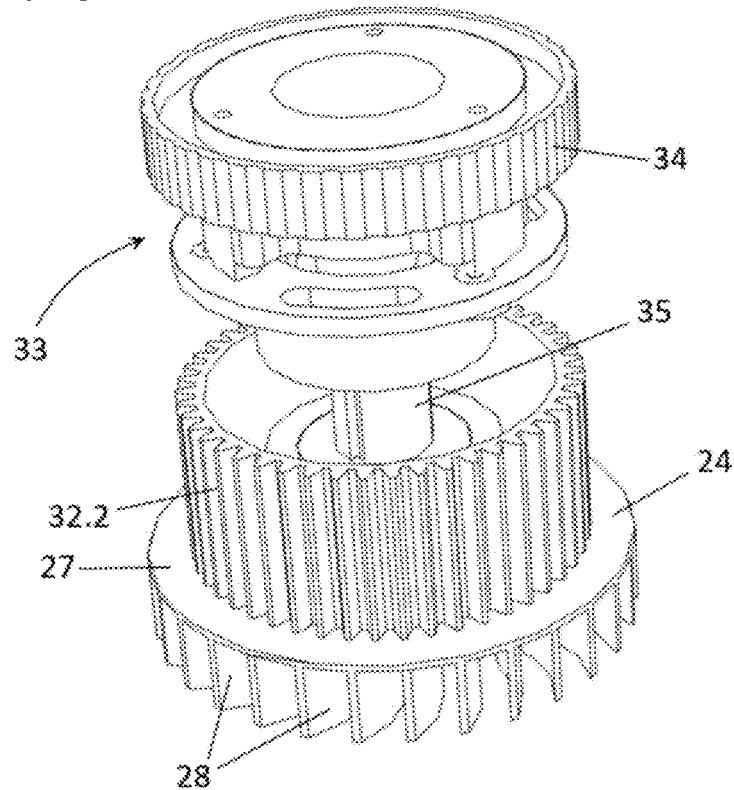

ELECTRIC COOKING APPLIANCE

CROSS-REFERENCE TO RELATED APPLICATIONS

This application claims priority from French application number 2109764, filed Sep. 17, 2021, the disclosure of which is hereby incorporated herein by reference.

TECHNICAL FIELD

The present invention generally relates to an electric cooking appliance for cooking food with or without pressure, such as an electric pressure cooker.

STATE OF THE ART

Document CN209090836U discloses a cooking appliance comprising:

- a housing unit comprising a cooking vat that delineates a cooking volume and that comprises an access opening through which food can be introduced into the cooking volume, and a lid that can be moved between an open position in which the lid allows access to the cooking vat and a closed position in which the lid prevents access to the cooking vat, the lid comprising a lid body and an inner lid attached to the lid body, the inner lid comprising a fixed closure portion that is attached to the lid body and a movable closure portion that can be moved relative to the fixed closure portion along a direction of travel and between a raised configuration in which the fixed closure portion and the movable closure portion seal the cooking vat tightly when the lid is in the closed position, and a lowered configuration in which the fixed closure portion and the movable closure portion define an air vent passage and an air intake passage that are each fluidly connected to the cooking volume when the lid is in the closed position,
- a drive mechanism configured to move the movable closure portion between the lowered configuration and the raised configuration,
- a fan positioned in the lid facing the movable closure portion and configured to generate an airflow in the cooking volume, the fan being configured such that the generated airflow is vented out of the cooking volume by flowing through the air vent passage and is re-introduced into the cooking volume by flowing through the air intake passage, and
- a heating device that is attached to the lid and that is configured to heat the airflow generated by the fan.

Such an electric cooking appliance allows food contained in the cooking volume to be cooked in a pressure cooking mode when the lid occupies the closed position and the movable closure portion is in the raised configuration simultaneously, and in a hot air cooking mode when the lid occupies the closed position and the movable closure portion is in the lowered configuration simultaneously.

According to the electric cooking appliance described in document CN209090836U, the heating device and the fan are positioned in an inner chamber delimited by the lid body and the inner lid, resulting in increased outer dimensions of the lid. Thus, in order to limit the size of the electric cooking appliance, it is necessary to limit the size of the cooking vat and therefore to limit the amount of food that can be cooked therein.

Moreover, the types of cooking that can be done with such an electric cooking appliance are limited.

SUMMARY OF THE INVENTION

The present invention aims to remedy all or part of these disadvantages.

The technical problem behind the invention consists in particular of providing a compact electric cooking appliance while allowing food to be cooked using different cooking methods, and in particular according to a pressure cooking mode and a hot air cooking mode, and of being able to make a greater number of recipes.

To this end, the present invention relates to an electric cooking appliance comprising:

- a housing unit comprising a cooking vat that delineates a cooking volume and that comprises an access opening through which food can be introduced into the cooking volume, and a lid that can be moved between an open position in which the lid allows access to the cooking vat and a closed position in which the lid prevents access to the cooking vat, the lid comprising a lid body and an inner lid attached to the lid body, the inner lid comprising a fixed closure portion that is attached to the lid body and a movable closure portion that can be moved relative to the fixed closure portion along a direction of travel and between a raised configuration in which the fixed closure portion and the movable closure portion seal the cooking vessel tightly when the lid is in the closed position, and a lowered configuration in which the lid is in the closed position while the fixed closure portion and the movable closure portion define an air vent passage to the outside of the cooking volume and an air intake passage to the inside of the cooking volume,
- a drive mechanism configured to move the movable closure portion between the lowered configuration and the raised configuration,
- a fan positioned in the lid facing the inner lid and configured to generate an airflow in the cooking volume, the fan being configured such that the generated airflow is vented out of the cooking volume by flowing through the air vent passage and is re-introduced into the cooking volume by flowing through the air intake passage,
- a heating device that is attached to the lid and that is configured to heat the airflow generated by the fan,
- characterized in that the heating device is positioned on an underside of the inner lid and located facing the cooking volume when the lid occupies the closed position, and in that the heating device is located near the air intake passage when the movable closure portion is in the lowered configuration.

Thus, the electric cooking appliance according to the present invention enables food contained in the cooking volume to be cooked according to a pressure cooking mode or according to a hot air cooking mode, at the user's discretion and like the electric cooking appliance described in document CN209090836U.

However, the specific configuration of the heating device also makes it possible to limit the size of the lid, and thus to maximize the cooking volume of the cooking vat without impacting the size of the electric cooking appliance.

Moreover, the position of the heating device facing the cooking volume also makes it possible to gratinate the food contained in the cooking vat at the end of the cooking time, which provides the electric cooking appliance according to the present invention with an additional cooking method compared to those that can be used with the electric cooking appliance described in document CN209090836U.

The electric cooking appliance can also have one or more of the following characteristics, taken alone or in combination.

According to one embodiment of the invention, the movable closure portion is movable in translation along a direction of travel.

According to one embodiment of the invention, the direction of travel is substantially vertical when the electric cooking appliance rests on a horizontal surface.

According to one embodiment, the air vent passage and the air intake passage are two separate passages.

According to one embodiment of the invention, the air vent passage and the air intake passage each lead to the cooking volume when the lid is in the closed position and the movable closure portion is in the lowered configuration.

According to one embodiment of the invention, the heating device is configured to be located at least partially facing the air intake passage when the movable closure portion is in the lowered configuration.

According to one embodiment of the invention, when the movable closure portion is in the lowered configuration, the fan is configured to radially direct the airflow from the air vent passage toward the air intake passage.

According to one embodiment of the invention, the fan is a centrifugal radial fan. Advantageously, the fan comprises an annular impeller comprising a plurality of blades.

According to one embodiment of the invention, the fan is moveable relative to the fixed closure portion according to the direction of travel and between a first fan position in which the fan is distanced from the heating device and the movable closure portion is in the raised configuration, and a second fan position in which the fan is close to the heating device and the movable closure portion is in the lowered configuration.

According to one embodiment of the invention, the inner lid and the lid body delineate an inner chamber of the lid that is configured to be fluidly connected to the cooking volume when the movable closure portion is in the lowered configuration, and to be fluidly isolated from the cooking volume when the movable closure portion is in the raised configuration.

According to one embodiment of the invention, the fan is configured to be positioned in the inner chamber of the lid when the fan occupies the first fan position.

According to one embodiment of the invention, the fan is configured to be positioned in the inner chamber of the lid and located facing the air intake passage when the fan occupies the second fan position.

According to one embodiment of the invention, the drive mechanism is configured to move the fan between the first fan position and the second fan position.

According to one embodiment of the invention, the drive mechanism is configured to simultaneously move the movable closure portion from the raised configuration to the lowered configuration and the fan from the first fan position to the second fan position, and to simultaneously move the movable closure portion from the lowered configuration to the raised configuration and the fan from the second fan position to the first fan position.

According to one embodiment of the invention, the air intake passage is generally annular and the heating device is configured to extend at least partially around the air intake passage.

According to one embodiment of the invention, the heating device is a resistance-type heating element. Advantageously, the resistance-type heating element is curved and is configured to extend at least partially around the air intake passage.

According to one embodiment of the invention, the resistance-type heating element is generally arc-shaped with, for example, a center angle greater than 180°, and for example greater than 270°.

According to one embodiment of the invention, the air intake passage and the air vent passage extend substantially coaxially.

According to one embodiment of the invention, the air vent passage is generally annular.

According to one embodiment of the invention, the air intake passage extends around the air vent passage.

According to one embodiment of the invention, the electric cooking appliance comprises a drive unit configured to rotate the fan, the drive unit comprising a drive motor and a motion transmission mechanism that is configured to transmit rotational movement from the drive motor to the fan. For example, the motion transmission mechanism may comprise a gear rotatably coupled to an output shaft of the drive motor and a gear wheel rotatably attached to the fan.

According to one embodiment of the invention, the movable closure portion comprises:
  a first closure member that is movable relative to the fixed closure portion according to the direction of travel, the first closure member being configured to close a first through aperture provided on the fixed closure portion when the movable closure portion is in the raised configuration and to open the first through aperture when the movable closure portion is in the lowered configuration, the first closure member and the fixed closure portion being configured to delineate the air intake passage when the movable closure portion is in the lowered configuration, and
  a second closure member that is movable relative to the first closure member according to the direction of travel, the second closure member being configured to close a second through aperture provided on the first closure member when the movable closure portion is in the raised configuration and to open the second through aperture when the movable closure portion is in the lowered configuration, the first and second closure members being configured to delineate the air vent passage when the movable closure portion is in the lowered configuration.

According to one embodiment of the invention, when the movable closure portion is in the lowered configuration, then the first closure member is spaced a first predetermined spacing distance from the fixed closure portion according to the direction of travel, and the second closure member is spaced a second predetermined spacing distance from the first closure member according to the direction of travel. Advantageously, the first and second spacing distances are substantially identical.

According to one embodiment of the invention, the first through aperture is provided in a central portion of the fixed closure portion, and the second through aperture is provided in a central portion of the first closure member.

According to one embodiment of the invention, the first closure member is annular.

According to one embodiment of the invention, the first and second closure members are positioned coaxially.

According to one embodiment of the invention, each of the first and second closure members is generally flat.

According to one embodiment of the invention, the inner lid comprises a sealing ring which is attached to the stationary closure portion and is configured to cooperate tightly with an upper peripheral edge of the cooking vat when the lid occupies the closed position.

According to one embodiment of the invention, the inner lid is removably attached to the lid body. These provisions make it easy to clean the lid and particularly the inner lid.

According to one embodiment of the invention, the drive mechanism comprises a gripping member that is configured to be operated by a user when the lid occupies the closed position, and which is rotatably mounted relative to the lid body around a rotation axis, the drive mechanism being configured such that rotating the gripping member in a first direction of rotation causes the movable closure portion to move to the lowered configuration and such that rotating the gripping member in a second direction of rotation, opposite to the first direction of rotation, causes the movable closure portion to move to the raised configuration.

According to one embodiment of the invention, the rotation axis of the gripping member is substantially parallel to the direction of travel.

According to one embodiment of the invention, the drive mechanism comprises a shipper shaft with a longitudinal axis that extends substantially parallel to the direction of travel, the shipper shaft being movable in translation relative to the lid body according to the direction of travel, the shipper shaft being mechanically connected to the gripping member and to the movable closure portion such that rotating the gripping member in the first direction of rotation causes the shipper shaft to move downward and the movable closure portion to move to the lowered configuration and such that rotating the gripping member in the second direction of rotation causes the shipper shaft to move upward and the movable closure portion to move to the raised configuration.

According to one embodiment of the invention, the second closure member is attached to the shipper shaft, and for example to a lower end portion of the shipper shaft.

According to one embodiment of the invention, the inner lid is a telescopic inner lid, the lowered configuration of the movable closure portion corresponding to a deployed configuration of the first and second closure members and the raised configuration of the movable closure portion corresponding to a retracted configuration of the first and second closure members.

According to one embodiment of the invention, the fan is translationally attached to the shipper shaft.

According to one embodiment of the invention, the electric cooking appliance comprises at least one bearing, such as a ball bearing, which is attached to the shipper shaft and which is configured to rotatably support the fan. For example, the bearing can be positioned between the gear wheel and the shipper shaft.

According to one embodiment of the invention, the fan is positioned around the shipper shaft. Advantageously, the fan and the shipper shaft are positioned coaxially.

According to one embodiment of the invention, the inner lid is configured to be located facing the cooking volume when the lid occupies the closed position.

According to one embodiment of the invention, the lid comprises an air vent opening leading to an outer surface of the lid, the air vent passage and the air intake passage being configured to be fluidly connected to the air vent opening.

According to one embodiment of the invention, the lid is pivotally mounted relative to the cooking vat.

According to one embodiment of the invention, the electric cooking appliance comprises a discharge valve that is attached to the lid, and for example to the fixed closure portion, and which is configured to fluidly connect the cooking volume with the atmosphere when the pressure in the cooking volume exceeds a predetermined threshold value.

According to one embodiment of the invention, the electric cooking appliance comprises a guide member that is attached to the lid body and that is configured to guide the translational movement of the shipper shaft relative to the lid body.

According to one embodiment of the invention, the electric cooking appliance comprises a control unit configured to control the operation of the electric cooking appliance according to a pressure-cooking mode when the lid occupies the closed position and the movable closure portion is in the lowered configuration simultaneously, and according to a hot air cooking mode when the lid occupies the closed position and the movable closure portion is in the lowered configuration simultaneously.

BRIEF DESCRIPTION OF THE FIGURES

In any event, the invention will be clearly understood with the help of the following description with reference to the appended schematic drawings showing, by way of non-limiting example, an embodiment of this electric cooking appliance.

FIG. 1 is a partially cutaway side view of an electric cooking appliance according to the present invention.

FIG. 2 is a longitudinal cross-sectional view of the electric cooking appliance in FIG. 1.

FIG. 3 is a partial perspective top view of a portion of the lid of the electric cooking appliance in FIG. 1.

FIG. 4 is another partial perspective top view of a portion of the lid of the electric cooking appliance in FIG. 1.

FIG. 5 is a perspective view from underneath of the portion of the lid in FIGS. 3 and 4 showing a movable closure portion in the raised configuration.

FIG. 6 is a perspective view from underneath of the portion of the lid in FIGS. 3 and 4 showing a movable closure portion in the lowered configuration.

FIG. 7 is a longitudinal cross-sectional view of the portion of the lid in FIG. 4 showing a movable closure portion in the raised configuration.

FIG. 8 is a longitudinal cross-sectional view of the portion of the lid in FIG. 4 showing a movable closure portion in the lowered configuration.

FIG. 9 is a truncated perspective view of the portion of the lid in FIG. 4 showing a movable closure portion in the raised configuration.

FIG. 10 is a truncated perspective view of the portion of the lid in FIG. 4 showing a movable closure portion in the lowered configuration.

FIG. 11 is a perspective top view of an inner lid belonging to the portion of the lid in FIG. 3 or 4 and showing a movable closure portion in the lowered configuration.

FIG. 12 is a perspective top view of a drive mechanism belonging to the electric cooking appliance in FIG. 1.

DETAILED DESCRIPTION

In this document, the terms "upper", "lower", "lowered" and "raised" used to describe the electric cooking appliance refer to the electric cooking appliance when in use, i.e., with the lid in the closed position and resting on a horizontal surface.

FIGS. 1 to 12 show an electric cooking appliance 2, and more particularly an electric pressure-cooking device, such as an electric pressure cooker or an electric pressure/multi-cooker.

As shown more particularly in FIGS. 1 and 2, the electric cooking appliance 2 comprises a housing unit 3 comprising a cooking vat 4 that delimits a cooking volume 5. The cooking vat 4 comprises a bottom wall 4.1, a side wall 4.2 that extends from the bottom wall 4.1, and an access opening 4.3 through which food can be introduced into the cooking volume 5, the access opening 4.3 being delimited by an upper peripheral edge of the side wall 4.2. According to the embodiment shown in the figures, the cooking vat 4 has a substantially circular cross-section. However, the cooking vat 4 could have a cross-section of a completely different shape, for example square or rectangular.

The housing unit 3 further comprises a moveable lid 6, for example pivotally mounted, between an open position in which the lid 6 enables access to the cooking volume 5 and a closed position in which the lid 6 prevents access to the cooking volume 5.

As shown more particularly in FIGS. 3 to 6, the lid 6 comprises a lid body 7 and an inner lid 8 attached to the lid body 7. The inner lid 8 is more particularly configured to be located facing the access opening 4.3 of the cooking vat 4 when the lid 6 occupies the closed position. The lid body 7 and the inner lid 8 delineate an inner chamber 9 that is fluidly connected to one or more air vent opening(s) 11 leading to an outer surface of the lid body 7.

The inner lid 8 comprises a fixed closure portion 12 which has, for example, a generally annular shape and which is attached to the lid body 7, for example in a removable way, and a movable closure portion 13 that is movable in translation relative to the fixed closure portion 12 in a direction of travel D. Advantageously, the direction of travel D is substantially vertical when the electric cooking appliance 2 rests on a horizontal surface.

The movable closure portion 13 can be moved between a raised configuration in which the fixed closure portion 12 and the movable closure portion 13 are configured to seal the cooking vat 4 when the lid 6 is in the closed position, and a lowered configuration in which the fixed closure portion 12 and the movable closure portion 13 define an air vent passage 14 to the outside of the cooking volume 5 and an air intake passage 15 to the inside of the cooking volume 5. However, other types of movement are possible without departing from the scope of protection of the invention, for example a helical movement combining a translational movement and a rotational movement. Advantageously, the inner chamber 9 is configured to be fluidly connected to the cooking volume 5, via the air vent passage 14 and the air intake passage 15, when the movable closure portion 13 is in the lowered configuration, and to be fluidly isolated from the cooking volume 5 when the movable closure portion 13 is in the raised configuration.

According to the embodiment shown in the figures, the air intake passage 15 and the air vent passage 14 are each generally annular, and are positioned substantially coaxially. Advantageously, the air intake passage 15 extends around the air vent passage 14, and the air vent passage 14 and the air intake passage 15 each lead to the cooking volume 5 when the lid 6 is in the closed position.

According to the embodiment shown in the figures, the inner lid 8 is telescopic and the movable closure portion 13 comprises:

a first closure member 16 that is annular and that is movable relative to the fixed closure portion 12 according to the direction of travel D and between a first closure position in which the first closure member 16 is configured to close a first through aperture 17 provided in a central part of the fixed closure portion 12, and a first opening position in which the first closure member 16 is spaced apart from the fixed closure portion 12 by a first spacing distance D1 measured according to the direction of travel D and is configured to open the first through aperture 17, and a second closure member 18 that is circular in shape and is movable relative to the first closure member 16 according to the direction of travel D and between a second closure position in which the second closure member 18 is configured to close a second through aperture 19 provided in a central portion of the first closure member 16, and a second opening position in which the second closure member 18 is spaced apart from the first closure member 16 by a second spacing distance D2 measured according to the direction of travel D, which may, for example, be substantially the same as or different from the first spacing distance D1, and is configured to open the second through aperture 19.

The first and second closure members 16, 18 are configured to respectively occupy the first and second closure positions when the movable closure portion 13 is in the raised configuration, and to respectively occupy the first and second opening positions when the movable closure portion 13 is in the lowered configuration.

Thus, the lowered configuration of the movable closure portion 13 corresponds to a deployed configuration of the first and second closure members 16, 18, and the raised configuration of the movable closure member 13 corresponds to a retracted configuration of the first and second closure members 16, 18.

Advantageously, the first closure member 16 is configured to press against an underside of the fixed closure portion 12 when the first closure member 16 occupies the first closure position, and the second closure member 18 is configured to press against an underside of the first closure member 16 when the second closure member 18 occupies the second closure position. The first closure member 16 may be provided with a first sealing element 16.1 positioned near an outer peripheral edge of the first closure member 16, and the second closure member 18 may be provided with a second sealing element 18.1 positioned near an outer peripheral edge of the second closure member 18.

According to the embodiment shown in the figures, the first and second closure members 16, 18 are positioned coaxially, and each of the first and second closure members 16, 18 is generally flat.

The first closure member 16 and the fixed closure portion 12 are more particularly configured to delineate the air intake passage 15 when the movable closure portion 13 is in the lowered configuration (and therefore when the first closure member 16 is in the first opening position), and the first and second closure members 16, 18 are more particularly configured to delineate the air vent passage 14 when the movable closure portion 13 is in the lowered configuration (and therefore when the second closure member 18 is in the second opening position).

According to the embodiment shown in the figures, the fixed closure portion 12 is configured to support the first closure member 16 when the first closure member 16 occupies the first opening position. To this end, the first closure member 16 comprises a plurality of first holding fingers 21 which are angularly offset from each other and which are positioned near the outer peripheral edge of the first closure member 16. The first holding fingers 21 are configured to rest on the fixed closure portion 12 when the first closure member 16 occupies the first opening position. In the illustrated example, the first holding fingers 21 are also configured to rotationally block the first closure member 16 relative to the fixed closure portion 12 when the first closure member 16 is moved between the first closure position and the first opening position.

Similarly, the second closure member 18 also comprises a plurality of second holding fingers 22 that are angularly offset from each other and are positioned near the outer peripheral edge of the second closure member 18. The second holding fingers 22 are configured to rest on the first fixed closure member 16 when the second closure member 18 occupies the second opening position. In the illustrated example, the second holding fingers 22 are also configured to rotationally block the second closure member 18 relative to the first closure member 16 when the second closure member 18 is moved between the second closure position and the second opening position.

The inner lid 8 further comprises a sealing ring 23 which is attached to the fixed closure portion 12 and which is configured to cooperate tightly with an upper peripheral edge of the cooking vat 4 when the lid 6 occupies the closed position.

The electric cooking appliance 2 also comprises a fan 24 which is configured to generate an airflow in the cooking volume 5, and a heating device 25 which is configured to heat the airflow generated by the fan 24.

According to the embodiment shown in the figures, the heating device 25 comprises a resistance heating element 26 which is attached to the fixed closure portion 12 and which extends along the underside of the fixed closure portion 12. Thus, the resistance heating element 26 is configured to be located facing the access opening 4.3 of the cooking vat 4 when the lid 6 occupies the closed position.

The resistance heating element is 26 is configured to extend partially around and near the air intake passage 15 when the movable closure portion 13 occupies the lowered configuration. Advantageously, the resistance heating element 26 is located partially facing the air intake passage 15 when the movable closure portion 13 is in the lowered configuration. The resistance heating element 26 may be generally arc-shaped with a center angle greater than 180°, and for example greater than 270°.

As shown in FIGS. 10 and 12, the fan 24 is a centrifugal radial fan, and comprises an annular wheel 27 comprising a plurality of blades 28 that are configured such that the generated airflow is vented out of the cooking volume 5 by flowing through the air vent passage 14 and is reintroduced into the cooking volume 5 by flowing through the air intake passage 15. Advantageously, when the movable closure portion 13 is in the lowered configuration, the fan 24 is configured to direct the airflow from the air vent passage 14 radially outward and toward the air intake passage 15.

The electric cooking appliance 2 further comprises a drive unit 29 configured to rotate the fan 24. The drive unit 29 comprises in particular a drive motor 31, visible in FIG. 4, and a motion transmission mechanism 32 which is configured to transmit rotational movement from the drive motor 31 to the fan 24. For example, the motion transmission mechanism 32 may comprise a gear 32.1 rotatably coupled to an output shaft of the drive motor 31 and a gear wheel 32.2 rotatably attached to the fan 24.

According to the embodiment shown in the figures, the fan 24 is positioned facing the inner lid 8 and is movable in translation relative to the fixed closure portion 12 according to the direction of travel D and between a first fan position in which the fan 24 is located in the inner chamber 9 and is distanced from the heating device 25, and a second fan position in which the fan 24 is close to the heating device 25 and is configured to be located facing the air intake passage 15. Advantageously, the fan 24 is positioned in the inner chamber 9 and recessed from the first through aperture 17 when the fan 24 occupies the first fan position, and is located beyond the first through aperture 17 when the fan 24 occupies the second fan position.

The electric cooking appliance 2 is more particularly configured such that the fan 24 occupies the first fan position when the movable closure portion 13 is in the raised configuration, and such that the fan 24 occupies the second fan position when the movable closure portion 13 is in the lowered configuration.

To this end, the electric cooking appliance 2 comprises a drive mechanism 33 configured to simultaneously move the movable closure portion 13 from the raised configuration to the lowered configuration and the fan 24 from the first fan position to the second fan position, and to simultaneously move the movable closure portion 13 from the lowered configuration to the raised configuration and the fan 24 from the second fan position to the first fan position.

According to the embodiment shown in the figures, the drive mechanism 33 comprises a gripping member 34 which is configured to be operated by a user. This gripping member 34 is rotatably mounted relative to the lid body 7 around a rotation axis A which is advantageously substantially parallel to the direction of travel D.

The drive mechanism 33 also comprises a shipper shaft 35 that has a longitudinal axis extending substantially parallel to the direction of travel D and that is movable in translation relative to the lid body 7 according to the direction of travel D. Advantageously, the electric cooking appliance 2 comprises a guide member 36 which is attached to the lid body 7 and which is configured to translationally guide the shipper shaft 35 relative to the lid body 7.

The shipper shaft 35 is mechanically connected to the gripping member 34 via a motion transformation mechanism 37 such that rotating the gripping member 34 in a first direction of rotation causes the shipper shaft 35 to move toward the cooking vat 4, i.e., downward, when the lid 6 occupies the closed position, and such that rotating the gripping member 34 in a second direction of rotation, opposite to the first direction of rotation, causes the shipper shaft 35 to move away from the cooking vat 4, i.e., upward, when the lid 6 occupies the closed position.

According to the embodiment shown in the figures, the fan 24 is positioned around the shipper shaft 35 and is translationally attached to the shipper shaft 35. To this end, the electric cooking appliance 2 comprises two bearings 38, such as ball bearings, whose inner rings are attached to the shipper shaft 35 and which are configured to rotatably support the fan 24. For example, each of the bearings 38 can be positioned between the gear wheel 32.2 and the shipper shaft 35. According to a variant embodiment of the invention, the electric cooking appliance 2 may have a single bearing 38 positioned between the gear wheel 32.2 and the shipper shaft 35.

The shipper shaft 35 is also mechanically connected to the movable closure portion 13 such that rotating the gripping member 34 in the first direction of rotation causes the movable closure portion 13 to move to the lowered configuration and such that rotating the gripping member 34 in the second direction of rotation causes the movable closure portion 13 to move to the raised configuration.

According to the embodiment shown in the figures, the second closure member 18 is attached to a lower end portion of the shipper shaft 35, and is configured to be moved by the shipper shaft 35 in an upstroke when the gripping member 34 is rotated in the second direction of rotation, the upstroke comprising a first upstroke portion in which the second closure member 18 is moved toward the first closure member 16 until it stops against an underside of the first closure member 16 and a second upstroke portion in which the first and second closure members 16, 18 are moved toward the fixed closure portion 12 until the first and second closure members 16, 18 reach the first and second closure positions, respectively.

The second closure member 18 is also configured to be moved by the shipper shaft 35 in a downstroke when the gripping member 34 is rotated in the first direction of rotation, the downstroke comprising a first downstroke portion in which the first and second closure members 16, 18 are moved away from the fixed closure portion 12 until the first closure member 16 reaches the first opening position and a second downstroke portion in which the second closure member 18 is moved away from the first closure member 16 until the second closure member 18 reaches the second opening position. During the first downstroke portion, the first closure member 16 is supported by the second closure member 18.

The electric cooking appliance 2 further comprises a discharge valve 41 which is attached to the lid 6, and for example to the fixed closure portion 12, and which can be configured to automatically fluidly connect the cooking volume 5 with the atmosphere when the pressure in the cooking volume 5 exceeds a predetermined threshold value.

The electric cooking appliance 2 further comprises an additional heating device 42 that is positioned in the housing unit 3 and is configured to heat the cooking vat 4 by conduction. The additional heating device 42 may, for example, comprise another resistance heating element, and is advantageously positioned below the bottom wall 4.1 of the cooking vat 4.

The electric cooking appliance 2 also comprises a control unit 43 which comprises, for example, a controller, such as a microcontroller, or a processor, such as a microprocessor, and which is configured to control the operation of the electric cooking appliance 2, and in particular of the heating device 25, of the additional heating device 42, of the drive motor 31, of the fan 24 but also of the discharge valve in a particular embodiment.

The control unit 43 is more particularly configured to control the operation of the electric cooking appliance 2 according to a pressure cooking mode when the lid 6 occupies the closed position and the movable closure portion 13 is in the raised configuration simultaneously, and according to a hot air cooking mode when the lid 6 occupies the closed position and the movable closure portion 13 is in the lowered configuration simultaneously.

When a user wishes to cook food contained in the cooking vat 4 according to a pressure cooking mode, he or she moves the lid 6 to the closed position and rotates the gripping member 34 in the second direction of rotation so as to move the movable closure portion 13 to the raised configuration. The cooking volume 5 is thus fluidly isolated from the inner chamber 9 and from the air vent openings 11.

The user can then set a pressure cooking mode using a user interface provided on the housing unit 3, and the control unit 43 then activates the additional heating device 42 so as to heat the cooking vat 4 and accordingly the food contained therein. As the cooking volume 5 is fluidly isolated from the inner chamber 9, the pressure within the cooking vat rises, allowing the food to be cooked under pressure.

When a user wishes to cook food contained in the cooking vat 4 according to a hot air cooking mode, he or she moves the lid 6 to the closed position and rotates the gripping member 34 in the first direction of rotation so as to move the movable closure portion 13 to the lowered configuration. When the movable closure portion is in such a configuration, the cooking volume 5 is fluidly connected to the inner chamber 9 and to the air vent openings 11.

The user can then set a hot air cooking mode using the user interface provided on the housing unit 3, and the control unit 43 then activates the drive motor 31 so as to rotate the fan 24 and generate an air flow within the cooking vat 4 and also activates the heating device 25 so as to heat this air flow generated by the fan 24. The specific position of the heating device 25 facing the air intake passage 15 makes it possible to transmit a maximum of calories to the airflow and thus to optimize the hot air cooking achieved with the electric cooking appliance 2 according to the present invention.

The electric cooking appliance 2 according to the present invention also makes it possible to gratinate the food contained in the cooking vat. For example, if a gratin cooking mode is selected, the control unit 43 can program the drive motor 31 to stop at the end of the hot air cooking cycle, while maintaining the power supply to the heating device 25, which ensures, due to its position facing the access opening of the cooking vat 4, gratinated cooking of the food.

It is also possible to start a gratinated cooking mode at the end of the pressure cooking cycle. According to one embodiment not shown in the figures, the electric cooking appliance 2 may not have a gripping member 34 and may instead comprise an electric motor that is mechanically connected to the shipper shaft 35 such that rotating the electric motor in a first direction of rotation would cause the shipper shaft 35 to move downward and such that rotating the electric motor in a second direction of rotation would cause the shipper shaft to move 35 upward.

Of course, the present invention is in no way limited to the embodiment described and illustrated, since this embodiment was only provided by way of example. Changes can still be made, particularly with regard to the constitution of the various elements or by substituting technical equivalents, without departing from the scope of protection of the invention.

The invention claimed is:

1. An electric cooking appliance comprising:
    a housing unit comprising a cooking vat delineating a cooking volume and comprising an access opening through which food is configured to be introduced into the cooking volume, and
    a lid configured to be moved between an open position in which the lid allows access to the cooking vat and a closed position in which the lid prevents access to the cooking vat, the lid comprising a lid body and an inner lid attached to the lid body, the inner lid comprising a fixed closure portion attached to the lid body and a movable closure portion configured to be moved relative to the fixed closure portion along a direction of travel and between a raised configuration in which the fixed closure portion and the movable closure portion seal the cooking vessel tightly when the lid is in the closed position, and a lowered configuration in which the lid is in the closed position while the fixed closure portion and the movable closure portion define an air vent passage to the outside of the cooking volume and an air intake passage to the inside of the cooking volume, a drive mechanism configured to move the movable closure portion between the lowered configuration and the raised configuration, a fan positioned in the lid facing the inner lid and configured to generate an airflow in the cooking volume, the fan configured such that the generated airflow is vented out of the cooking volume by flowing through the air vent passage and is re-introduced into the cooking volume by flowing through the air intake passage, and a heating device attached to the lid and configured to heat the airflow generated by the fan, wherein the heating device is positioned on an underside of the inner lid and located facing the cooking volume when the lid occupies the closed position, and the heating device is located near the air intake passage when the movable closure portion is in the lowered configuration.

2. The electric cooking appliance according to claim 1, wherein the heating device is configured to be located at least partially facing the air intake passage when the movable closure portion is in the lowered configuration.

3. The electric cooking appliance according to claim 1, wherein, when the movable closure portion is in the lowered configuration, the fan is configured to radially direct the airflow from the air vent passage toward the air intake passage.

4. The electric cooking appliance according to claim 1, wherein the fan is moveable relative to the fixed closure portion according to the direction of travel and between a first fan position in which the fan is distanced from the heating device and the movable closure portion is in the raised configuration, and a second fan position in which the fan is close to the heating device and the movable closure portion is in the lowered configuration.

5. The electric cooking appliance according to claim 1, wherein the inner lid and the lid body delineate an inner chamber of the lid that is configured to be fluidly connected to the cooking volume when the movable closure portion is in the lowered configuration, and to be fluidly isolated from the cooking volume when the movable closure portion is in the raised configuration.

6. The electric cooking appliance according to claim 1, wherein the air intake passage is generally annular and the heating device is configured to extend at least partially around the air intake passage.

7. The electric cooking appliance according to claim 1, wherein the air intake passage and the air vent passage extend substantially coaxially.

8. The electric cooking appliance according to claim 1, wherein the movable closure portion comprises:

a first closure member movable relative to the fixed closure portion according to the direction of travel, the first closure member configured to close a first through aperture provided on the fixed closure portion when the movable closure portion is in the raised configuration and to open the first through aperture when the movable closure portion is in the lowered configuration, the first closure member and the fixed closure portion configured to delineate the air intake passage when the movable closure portion is in the lowered configuration, and a second closure member movable relative to the first closure member according to the direction of travel, the second closure member configured to close a second through aperture provided on the first closure member when the movable closure portion is in the raised configuration and to open the second through aperture when the movable closure portion is in the lowered configuration, the first and second closure members configured to delineate the air vent passage when the movable closure portion is in the lowered configuration.

9. The electric cooking appliance according to claim 8, wherein the first and second closure members are positioned coaxially.

10. The electric cooking appliance according to claim 1, wherein the inner lid is removably attached to the lid body.

11. The electric cooking appliance according to claim 1, wherein the drive mechanism comprises a gripping member configured to be operated by a user and rotatably mounted relative to the lid body around a rotation axis, the drive mechanism configured such that rotating the gripping member in a first direction of rotation causes the movable closure portion to move to the lowered configuration and such that rotating the gripping member in a second direction of rotation, opposite to the first direction of rotation, causes the movable closure portion to move to the raised configuration.

12. The electric cooking appliance according to claim 11, wherein the drive mechanism comprises a shipper shaft with a longitudinal axis that extends substantially parallel to the direction of travel, the shipper shaft movable in translation relative to the lid body according to the direction of travel, the shipper shaft mechanically connected to the gripping member and to the movable closure portion such that rotating the gripping member in the first direction of rotation causes the shipper shaft to move downward and the movable closure portion to move to the lowered configuration and such that rotating the gripping member in the second direction of rotation causes the shipper shaft to move upward and the movable closure portion to move to the raised configuration.

* * * * *